US008989527B2

United States Patent
Joinson

(10) Patent No.: US 8,989,527 B2
(45) Date of Patent: Mar. 24, 2015

(54) METHOD AND SYSTEM FOR DETERMINING THE LOCATION OF A FIBER OPTIC CHANNEL ALONG THE LENGTH OF A FIBER OPTIC CABLE

(75) Inventor: Daniel Joinson, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/977,496

(22) PCT Filed: Dec. 29, 2011

(86) PCT No.: PCT/EP2011/074252
§ 371 (c)(1),
(2), (4) Date: Jun. 28, 2013

(87) PCT Pub. No.: WO2012/089818
PCT Pub. Date: Jul. 5, 2012

(65) Prior Publication Data
US 2013/0279841 A1 Oct. 24, 2013

(30) Foreign Application Priority Data

Dec. 31, 2010 (EP) .................................... 10197477

(51) Int. Cl.
*G02B 6/00* (2006.01)
*E21B 47/09* (2012.01)
*G01B 7/02* (2006.01)
*G01B 11/02* (2006.01)

(52) U.S. Cl.
CPC .............. *G02B 6/00* (2013.01); *E21B 47/0905* (2013.01); *G01B 7/02* (2013.01); *G01B 11/02* (2013.01)
USPC ............................................. 385/12; 385/13

(58) Field of Classification Search
CPC ........................... E21B 47/0905; E21B 47/123
USPC ............................................................ 385/13
See application file for complete search history.

(56) References Cited

U.S. PATENT DOCUMENTS

| 3,941,927 | A | | 3/1976 | Russell ........................... 178/7.6 |
| 6,148,123 | A | * | 11/2000 | Eslambolchi et al. ............ 385/13 |
| 2004/0163809 | A1 | | 8/2004 | Mayeu ........................ 166/255.1 |
| 2013/0294720 | A1 | * | 11/2013 | Koelman et al. ................. 385/13 |

FOREIGN PATENT DOCUMENTS

JP 01-035284 2/1989 ............ G01R 33/032

OTHER PUBLICATIONS

Temposonics Technology, Absolute Non-Contact Linear Position and Liquid-Level Sensors.
PCT International Search Report, Application No. PCT/EP2011/074252 dated Feb. 28, 2012.

* cited by examiner

Primary Examiner — Omar R Rojas

(57) ABSTRACT

The location of one or more fiber optic channels (16) along the length of a fiber optic cable (12) is determined by: a) arranging an electrical conductor and a magnetic source at a known location adjacent to at least one of the channels (16); b) transmitting an electrical current through the electrical conductor, thereby deforming the electrical conductor by Lorenz forces in the vicinity of the magnetic source; c) conveying the deformation of the electrical conductor to deform an adjacent channel (16); d) transmitting light pulses through the fiber optic cable (12) and using variations in the light pulses back reflected by the deformed channel (16) and the known location of the magnetic source to determine the location of the deformed channel (16).

14 Claims, 1 Drawing Sheet

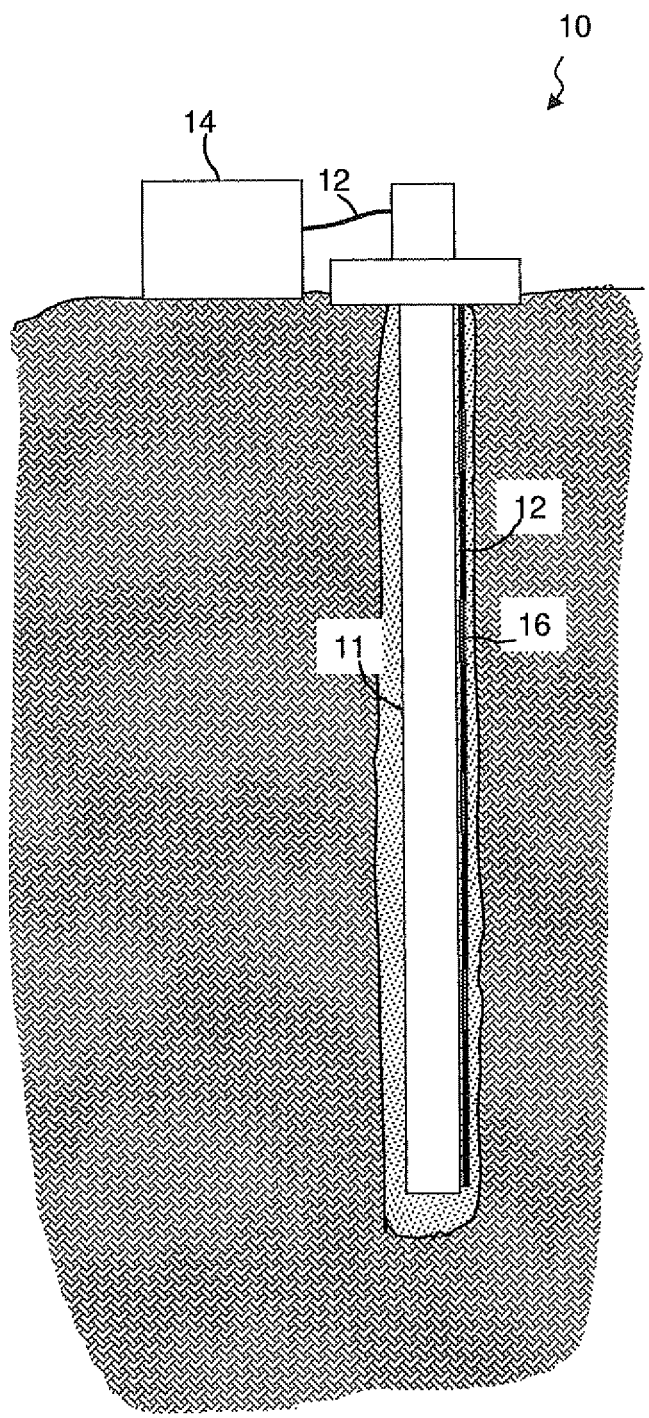

METHOD AND SYSTEM FOR DETERMINING THE LOCATION OF A FIBER OPTIC CHANNEL ALONG THE LENGTH OF A FIBER OPTIC CABLE

PRIORITY CLAIM

The present application claims priority from PCT/EP2011/074252, filed Dec. 29, 2011, which claims priority from European application 10197477.2, filed Dec. 31, 2010, which is incorporated herein by reference.

TECHNICAL FIELD OF THE INVENTION

The present disclosure relates generally to a system and a method for improving the accuracy of location measurements made using fiber optic cable and backscattered light.

BACKGROUND OF THE INVENTION

The use of backscattered light in fiber optic cables has found increasing acceptance in a variety of applications. Because light can be backscattered from any location along the length of a fiber, information can be obtained over significant distances and such systems are often referred to as "distributed" sensors. Because distortion or deformation of the fiber can be sensed, distributed sensors comprised of fiber optic cable can be used to sense temperature, pressure, strain, acoustic events, and the like. Distributed systems have been used advantageously in oilfield applications, in traffic monitoring, and in military/security applications, among others.

In a typical fiber optic-based distributed sensing system, one or more fiber optic cables designed to collect distributed strain measurements are deployed in a desired location and coupled to the sensing subject by suitable means. One or more light boxes containing laser light sources and signal-receiving means are optically coupled to the fiber. In some embodiments, the light source may be a long coherence length phase-stable laser and is used to transmit direct sequence spread spectrum encoded light down the fiber. The cable may be double-ended, i.e. may be bent in the middle so that both ends of the cable are at the source, or it may be single-ended, with one end at the source and the other end at a point that is remote from the source. The length of the cable can range from a few meters to several kilometers, or even hundreds of kilometers. In any case, measurements can be based solely on backscattered light, if there is a light-receiving means only at the source end of the cable, or a light receiving means can be provided at the second end of the cable, so that the intensity of light at the second end of the fiber optic cable can also be measured.

When it is desired to make measurements, the light source transmits at least one light pulse into the end of the fiber optic cable and a backscattered signal is received at the signal-receiving means. Localized strain or other disruptions cause small changes to the fiber, which in turn produce changes in the backscattered light signal. The returning light signal thus contains both information about the deformation of the fiber and location information indicating where along the fiber it occurred. Known Optical Time-Domain Reflectometry (OTDR) methods can be used to infer information about the sensing subject based on the backscattered signal from one or more segments of the fiber adjacent to the subject. Typically, the location of the backscattering reflection at a point along the fiber can be determined using spread spectrum encoding, which uniquely encodes the time of flight along the length of the fiber, dividing the fiber into discrete channels along its length.

In some applications, including downhole applications, the physical channel depths cannot practically be measured directly, but they can be roughly inferred on the basis of timing and fiber refraction index, i.e. the "optical depth." These rough calculations are not sufficiently precise for some purposes, however, because they incorporate uncertainties that, while small on a percent scale, build to a significant magnitude over the length of the fiber. For downhole seismic applications, repeatable physical depth positioning of the channels within an accuracy of 1 meter or better is desired.

US patent application US2004/163809 discloses a method to determine the position of a sliding or rotational sleeve valve by arranging bare fiber optical cable and/or Fiber Bragg Grating (FBG) sensors in the valve housing surrounding the sleeve, such that different sensors are deformed by mechanic or magnetic devices connected to the sleeve as the sleeve slides or rotates within the housing and this deformation is correlated to the position of the sleeve.

U.S. Pat. No. 3,941,927 discloses that deformation in an optical channel can be induced by an adjacent electrical conductor with flowing current and a magnetic field source.

Japanese patent application JP 1 035284 discloses that a fiber optical magnetic field sensor can be made by arranging an electrical field and a flux of electrical current near an optical channel so that the optical channel is deformed by Lorentz force acting between the electrical field and flux of electrical current.

Currently, however, there is no practical way to accurately determine the actual physical location of a given backscattered signal in an elongate optical fiber arranged in an elongate well or other encapsulation.

Hence, there remains a need for a method and system that would allow the physical location of a given backscattered signal to be determined with a desired accuracy and, if possible not requiring re-entering the well or other optical fiber encapsulation at a later date to measure channel drift.

SUMMARY OF THE INVENTION

In accordance with the invention there is provided a method for determining the physical location of at least one of a series of fiber optic channels distributed along at least part of the length of a fiber optic cable, comprising the steps of:
a) arranging an electrical conductor adjacent to the at least one of a series of fiber optic channels;
b) arranging at least one magnetic source at a known physical location in the vicinity of the electrical conductor;
c) transmitting an electrical current through the electrical conductor;
d) inducing the magnetic source to deform the electrical conductor in the vicinity of the magnetic source;
e) conveying the deformation of the electrical conductor to the at least one of the series of fiber optic channels;
f) transmitting light pulses through the fiber optic cable and using time of flight information of back-reflections of the light pulses transmitted by the series of fiber optic channels to obtain information about the locations of the channels along the length of the fiber optic cable (which is known as OTDR); and
g) using variations in the light pulses back-reflected by the at least one of the series of fiber optic channel, which is located in the vicinity of the at least one magnetic source, as a result of the deformation induced in accordance with step (e) and the known physical location of the magnetic source to determine the physical location of the at least one of the series of fiber optic channels, wherein the fiber optic cable comprises a contiguous series of fiber optic channels that are distributed along at least part of the length of the fiber optic cable and the method is used to identify which of these channels is located adjacent to the magnetic source.

The fiber optic cable may be located in an underground wellbore of a hydrocarbon fluid production well and the fiber optical cable is used to record physical parameters of the produced hydrocarbon fluid and/or the production process, which physical parameters are used to manage and optimize the hydrocarbon fluid production process, whereby the fiber optical cable may perform as a Distributed Temperature Sensor (DTS), a Distributed Pressure Sensor (DPS) a Distributed Acoustic Sensor (DAS) and/or as a Distributed Chemical Sensor (DCS), which DTS, DPS, DAS and/or DCS may be used during and to optimize hydrocarbon fluid production operations.

Optionally a varying electrical current is transmitted to the electrical conductor such that varying Lorenz forces initiate varying deformations of the electrical conductor and adjacent fiber optic channel, which current may be a periodically varying electrical current is transmitted through the electrical conductor such that periodically varying Lorenz forces induce periodically varying deformations of the electrical conductor and adjacent fiber optical channel, wherein the frequency of the periodically varying electrical current may be varied to vary the frequency of the associated periodically varying deformations of the electrical conductor and adjacent fiber optic channel to enable identification that said deformations are generated by the periodically varying current.

The fiber optic cable may comprise a contiguous series of fiber optic channels that are distributed along at least part of the length of the fiber optic cable and the method may be used to identify which of these channels is located adjacent to the magnetic source an the at least one magnetic source may comprise a permanent magnet arranged in the vicinity of the fiber optical cable and electrical conductor.

Optionally, the electrical conductor is a protective metallic tube, which is arranged around the fiber optic cable and a gel may fill an annular space between the metallic protective tube and the optical fiber, which gel conveys deformation from the protective metallic tube to the optical fiber.

Alternatively, the electrical conductor is an electrically conductive cable, which extends in a direction substantially parallel to the fiber optic cable, which electrical cable may extend through an annular protective layer, which surrounds the fiber optic cable.

In accordance with the invention there is furthermore provided a system for determining the physical location of at least one of a series of fiber optic channel distributed along at least part of the length of in a fiber optic cable, comprising:
a) an electrical conductor arranged adjacent to the at least one of a series of fiber optic channels;
b) at least one magnetic source having a known physical location, which source is also located in the vicinity of the electrical conductor and the at least one of a series of fiber optic channels;
c) means for transmitting an electrical current through the electrical conductor and to induce the magnetic source to deform the electrical conductor and optical channel in the vicinity of the magnetic source;
d) means for transmitting light pulses through the fiber optic cable and for using time of flight information of back reflections of the light pulses transmitted by the series of fiber optic channels cable to obtain information about the locations of the fiber optic channels along the length of the fiber optic cable; and
e) means for using variations in the light pulses back reflected by the fiber optic channel as a result of the deformation induced in accordance with step (c) and the known physical location of the magnetic source to determine the physical location of the fiber optic channel, wherein the fiber optic cable comprises a contiguous series of fiber optic channels that are distributed along at least part of the length of the fiber optic cable and the system is used to identify which of these channels is located adjacent to the magnetic source.

It will be understood that if a magnetic field source is arranged adjacent to an assembly of a fiber optic channel and adjacent electrical conductor this will generate a Lorentz force or other electromagnetic effect, such as a magnetorestrictive force, which enables to establish the location of the magnetic field source with respect to the fiber optic channel. The Lorentz force can be applied by including an electrical conductor deployed near the fiber optic cable and passing a current through the electrical conductor so as to cause it to deform as a result of the magnetic field generated by the magnetic field source. In these instances, an optical signal can be used in conjunction with OTDR in the fiber optic channel to detect the deformation and thereby determine location of the channel. The magnetic field source may or may not be fixed with respect to the fiber optic cable.

These and other features, embodiments and advantages of the method and system according to the invention are described in the accompanying claims, abstract and the following detailed description of non-limiting embodiments depicted in the accompanying drawing, in which description reference numerals are used which refer to corresponding reference numerals that are depicted in the drawing.

BRIEF DESCRIPTION OF THE DRAWING

For a more complete understanding of the preferred embodiments, reference is made to the accompanying drawing, which is a schematic illustration of a system in accordance with a first embodiment of the invention.

DETAILED DESCRIPTION OF ILLUSTRATIVE EMBODIMENTS

The present invention relates generally to a system and a method that allows the physical location of backscattered signals in a fiber optic cable to be determined with precision.

Referring initially to the FIGURE, a well 10 contains a fiber optic cable 12 that follows the well. Cable 12 is optically coupled at one end to a light box 14, such as are known in the art. Cable 12 may be double-ended, i.e. may be bent in the middle so that both ends of the cable are alternatively connected to the light source, or it may be single-ended, with one end at the source and the other end at a point that is remote from the light source. In the embodiment illustrated in the FIGURE, well 10 contains a tubular 11, such as a casing or liner. Cable 12 is run into the well in conjunction with tubular 11 and cement is pumped into the annulus between the tubular and the wellbore, thereby mechanically coupling cable 12 to the formation.

It will be understood by those skilled in the art that there are many suitable techniques by which cable 12 can be coupled to the formation or other subject environment. In the case of well 10, cable 12 can be clamped to tubular 11 or adhered to its inner or outer surface, either in a groove, or not. Cable 12 can be emplaced with the cement or lowered via a wireline. In the latter instance, cable 12 may or may not be subsequently mechanically affixed to the tubular.

Even though, as described above, the cable can be optically interrogated and the resulting optical signal used to divide the fiber into sections or "channels" 16 whose nominal distances from the light box are known, it is not possible to know precisely where each channel 16 is located in relation to the physical environment.

The method and system according to the invention provide information about the location of at least one of a series of channels 16 at a given point in time. So long as the channels 16 do not move, signals received from each channel 16 can be relied on to provide location information. Over extended time periods, however, it may be expected that changes in the optical properties of the fiber may result in movement or change in the actual location of one or more of the channels as-detected. The length of such time periods can depend on the nature of the fiber, the materials from which it is constructed, and the environment in which it is deployed, and can be on the order of 1, 10, 50, or more years. Thus, in instances where it is anticipated that the fiber will be used for a protracted period magnets may be arranged adjacent to one or more channels 16 that are distributed along the length of cable 12, as illustrated schematically in the FIGURE. The length of the magnet adjacent to channel 16 is preferably relatively short compared to the total length of cable 12.

If a electrical conductor is arranged adjacent to the fiber optic cable 12 then the each magnet 16 will induce Lorenz forces in the electrical conductor and also in the fiber optical cable 12 if the is a physical or acoustic contact between the electrical conductor and fiber optical cable. As a result of this physical or acoustic contact, channel 16 will be visible on a DAS system if a periodically varying electrical current is transmitted through the electrical conductor and the magnet generates associated varying Lorenz forces, thereby generating ambient noise, even if no other noise-generating operations are occurring. Thus, if the actual positions (depths) of the magnets are known accurately, each magnet located adjacent to a channel 16 can serve as a location key and the calibration between OTDR time and cable depth can be calibrated by observing the segments in a conventional DAS measurement. Still further, if the actual positions of magnets do not change as a function of time, the calibration between OTDR time and cable depth can be continuously monitored. If the actual positions of magnets do change over time, the relationship between OTDR time and cable depth can be re-calibrated.

As with the fiber optic channels, the physical locations of the magnets can be initially determined and/or subsequently re-determined in several ways. By way of example only, each magnet may be detected by lowering a magnetically sensitive logging tool into the well and detecting the depth at which the magnetically sensitive logging tool detects changes to the earth magnetic field generated by the magnet.

In still other embodiments, (not shown) one or more localized magnetic field sources are placed in proximity to the fiber and an electrical conductor such as a conducting wire is also placed in proximity to the fiber. In one embodiment, a plurality of localized magnetic field sources is deployed in a spaced-apart manner along the length of a fiber. When a current is passed through the wire, the magnetic field generated by each magnetic field source will cause a force, called the Lorenz force, to be applied locally to the wire. The direction of the force is orthogonal to both the electric current and magnetic field. In the present application the magnetic field is preferably anisotropic and arranged to be orthogonal to the wire. Thus, the Lorenz force will be orthogonal to the wire, with the result that the wire will be locally curved when current is flowing through the wire. A Lorenz force can be generated using either DC or AC currents, with the effect that vibrations or variable and tunable frequency can be generated.

Because the fiber optic sensors are extremely sensitive, the small deformation of the wire resulting from the application of the Lorenz force can be detected using OTDR techniques. Thus, if the physical location of the of the deformation (magnetic field) is known, each magnetic field source can be used as a location key, i.e. used to calibrate the physical locations of the fiber optic channels. As discussed above, a wireline or similar tool can be used to sense and locate each magnetic field source. In a variation on this embodiment, the magnetic field source(s) can be provided separately from the fiber. In this variation, a conducting wire is preferably included with or near the fiber and one or more magnets is moved along the fiber, e.g. by means of a logging tool that is lowered into the wellbore 10. The localized magnetic field will cause a localized deflection of the conducting wire, which can in turn be detected using OTDR techniques.

When the exciting current is switched off, the fiber and DAS system performance will be unaffected. When the exciting current is switched on, the fibre and DAS system will only be subjected to vibrations where the magnetic sources are located and not at other locations.

By way of example only, the magnetic field sources may be neodymium magnets and the fiber optic cable may be encapsulated in an optional metal tube that is transparent to magnetic fields. Further by way of example, magnetic field sources can be built into traditional tubing clamps that are used to retain cables during and the fibre cables can be manufactures to include a conductive wire.

Like the other techniques described above, the Lorenz-force technique can be used to mark locations on the fibre for depth calibration purposes that will not change with time.

As is known in the art, if the location of each fiber optical channel is known, the fiber optic channels can be interrogated in the time scale of fractions of a millisecond, providing a virtually instantaneous measurement at all depths of interest. The information gained in this manner can be used to diagnose and correct a geomechanical model or can be used to directly intervene in the treatment with or without integration with other measurements.

The present methods have no inherent lower limit to the frequency of investigation and are therefore limited only by the stability of the hardware over long time scales. There are various methods of backscatter measurement, including the use of Rayleigh and Brillouin backscattering, and one method may be preferred over others for this implementation of the present invention, especially at low frequency.

Illustrative embodiments of the present claimed subject matter have been described in detail. In the interest of clarity, not all features of an actual implementation are described in this specification. It will be understood that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure. In the claims, unless explicitly stated, the sequential recitation of steps is not intended to require that the steps be performed sequentially.

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope of the claims. By way of example only, one of skill in the art will recognize that the number and location of the magnetic sources, the manner for determining the magnetic source position, the number and configuration of cables and sensors, the sampling rate and frequencies of light used, and the nature of the cable, coupling devices, light sources and photodetectors can all be modified. Accordingly, the protection sought herein is as set forth in the claims below.

The invention claimed is:

1. A method for determining the physical location of at least one of a series of fiber optic channels distributed along at least part of the length of a fiber optic cable, the method comprising the steps of:
    a) arranging an electrical conductor adjacent to the at least one of a series of fiber optic channels;
    b) arranging at least one magnetic source at a known physical location in the vicinity of the electrical conductor;
    c) transmitting an electrical current through the electrical conductor;
    d) inducing the magnetic source to deform the electrical conductor in the vicinity of the magnetic source;
    e) conveying the deformation of the electrical conductor to the at least one of the series of fiber optic channels;
    f) transmitting light pulses through the fiber optic cable and using time of flight information of back reflections of the light pulses transmitted by the series of fiber optic channels to obtain information about the locations of the channels along the length of the fiber optic cable; and
    g) using variations in the light pulses back reflected by the at least one of the series of fiber optic channels, which is located in the vicinity of the at least one magnetic source, as a result of the deformation induced in accordance with step (e) and the known physical location of the magnetic source to determine the physical location of the at least one of the series of fiber optic channels, wherein the fiber optic cable comprises a contiguous series of fiber optic channels that are distributed along at least part of the length of the fiber optic cable and the method is used to identify which of these channels is located adjacent to the magnetic source.

2. The method according to claim 1, wherein the fiber optic cable is located in an underground wellbore and the magnetic source is located at a known location along the length of the wellbore.

3. The method according to claim 2, wherein the underground wellbore is a hydrocarbon fluid production well and the fiber optical cable is used to record physical parameters of the produced hydrocarbon fluid and/or the production process, which physical parameters are used to manage and optimize the hydrocarbon fluid production process.

4. The method according to claim 1, wherein the fiber optical cable performs as a Distributed Temperature Sensor (DTS), a Distributed Pressure Sensor (DPS) a Distributed Acoustic Sensor (DAS) and/or as a Distributed Chemical Sensor (DCS).

5. The method according to claim 4 wherein the DTS, DPS, DAS and/or DCS is used during and to optimize hydrocarbon fluid production operations.

6. The method according to claim 1, wherein a varying electrical current is transmitted to the electrical conductor such that varying Lorenz forces initiate varying deformations of the electrical conductor and adjacent fiber optic channel.

7. The method according to claim 6, wherein a periodically varying electrical current is transmitted through the electrical conductor such that periodically varying Lorenz forces induce periodically varying deformations of the electrical conductor and adjacent fiber optical channel.

8. The method according to claim 7, wherein the frequency of the periodically varying electrical current is varied to vary the frequency of the associated periodically varying deformations of the electrical conductor and adjacent fiber optic channel to enable identification that said deformations are generated by the periodically varying current.

9. The method of claim 1, wherein the at least one magnetic source comprises a permanent magnet arranged in the vicinity of the fiber optical cable and electrical conductor.

10. The method of claim 1, wherein the electrical conductor is a protective metallic tube, which is arranged around the fiber optic cable.

11. The method of claim 10, wherein a gel fills an annular space between the metallic protective tube and the optical fiber, which gel conveys deformation from the protective metallic tube to the optical fiber.

12. The method of claim 1, wherein the electrical conductor is an electrically conductive cable, which extends in a direction substantially parallel to the fiber optic cable.

13. The method of claim 12, wherein the electrical conductor extends through an annular protective layer, which surrounds the fiber optic cable.

14. A system for determining the physical location of at least one of a series of fiber optic channels distributed along at least part of the length of in a fiber optic cable, comprising:
    a) an electrical conductor arranged adjacent to the at least one of a series of fiber optic channels;
    b) at least one magnetic source having a known physical location, which source is also located in the vicinity of the electrical conductor and the at least one of a series of fiber optic channels;
    c) means for transmitting an electrical current through the electrical conductor and to induce the magnetic source to deform the electrical conductor and optical channel in the vicinity of the magnetic source;
    d) means for transmitting light pulses through the fiber optic cable and for using time of flight information of back reflections of the light pulses transmitted by the series of fiber optic channels cable to obtain information about the locations of the fiber optic channels along the length of the fiber optic cable; and
    e) means for using variations in the light pulses back reflected by the fiber optic channel as a result of the deformation induced in accordance with step (c) and the known physical location of the magnetic source to determine the physical location of the fiber optic channel, wherein the fiber optic cable comprises a contiguous series of fiber optic channels that are distributed along at least part of the length of the fiber optic cable and the system is used to identify which of these channels is located adjacent to the magnetic source.

* * * * *